United States Patent
Wang (10) Patent No.: US 12,489,655 B2
(45) Date of Patent: Dec. 2, 2025

(54) ROUTING CONTROL METHOD AND APPARATUS, SYSTEM AND BORDER GATEWAY PROTOCOL PEER

(71) Applicant: CHINA TELECOM CORPORATION LIMITED, Beijing (CN)

(72) Inventor: Aijun Wang, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 544 days.

(21) Appl. No.: 17/915,195

(22) PCT Filed: Apr. 28, 2021

(86) PCT No.: PCT/CN2021/090597
§ 371 (c)(1),
(2) Date: Sep. 28, 2022

(87) PCT Pub. No.: WO2021/219010
PCT Pub. Date: Nov. 4, 2021

(65) Prior Publication Data
US 2023/0123614 A1  Apr. 20, 2023

(30) Foreign Application Priority Data
Apr. 30, 2020  (CN) .......................... 202010360605.7

(51) Int. Cl.
*H04L 12/46* (2006.01)
*H04L 45/033* (2022.01)
(Continued)

(52) U.S. Cl.
CPC ........ *H04L 12/4641* (2013.01); *H04L 45/033* (2022.05); *H04L 45/76* (2022.05);
(Continued)

(58) Field of Classification Search
CPC ... H04L 12/4641; H04L 45/033; H04L 45/76; H04L 67/104; H04L 45/745;
(Continued)

(56) References Cited

U.S. PATENT DOCUMENTS

2004/0037296 A1    2/2004  Kim et al.
2006/0193329 A1*   8/2006  Asati ....................... H04L 45/46
                                                        370/395.53
(Continued)

FOREIGN PATENT DOCUMENTS

CN    1414749 A    4/2003
CN    1578235 A    2/2005
(Continued)

OTHER PUBLICATIONS

Jang et al.; Covering Prefixes Outbound Route Filter for BGP-4; Mar. 6, 2015; IESG; pp. 0-19 (Year: 2015).*
(Continued)

*Primary Examiner* — Jae Y Lee
*Assistant Examiner* — Nhu Pham
(74) *Attorney, Agent, or Firm* — Andrew M. Calderon; Calderon Safran & Wright P.C.

(57) ABSTRACT

The present disclosure relates to a routing control method, a system, and a BGP Peer. The method of the present disclosure can be executed by a first BGP Peer, including: receiving information of adding a new VPN route sent from a second BGP Peer, wherein the information of adding the new VPN route comprises: the new VPN route and an identifier of a first VPN instance; determining whether a number of VPN routes corresponding to the identifier of the first VPN instance reaches or exceeds a limit value after adding the new VPN route; and sending first instruction information to the second BGP Peer to instruct the second BGP Peer, in a case that the number of VPN routes corre- (Continued)

sponding to the identifier of the first VPN instance reaches or exceeds the limit value, wherein the first BGP Peer is an iBGP Peer inside a first AS.

18 Claims, 5 Drawing Sheets

(51) Int. Cl.
*H04L 45/745* (2022.01)
*H04L 45/76* (2022.01)
*H04L 65/1083* (2022.01)
*H04L 67/104* (2022.01)

(52) U.S. Cl.
CPC .......... *H04L 67/104* (2013.01); *H04L 45/745* (2013.01); *H04L 65/1083* (2013.01)

(58) Field of Classification Search
CPC . H04L 65/1083; H04L 45/04; H04L 65/1036; H04L 65/1069; H04L 45/50; H04L 45/54
See application file for complete search history.

(56) References Cited

U.S. PATENT DOCUMENTS

| | | |
|---|---|---|
| 2008/0219270 A1 | 9/2008 | Asati |
| 2014/0219135 A1 | 8/2014 | Li et al. |
| 2017/0093641 A1 | 3/2017 | Utgikar |

FOREIGN PATENT DOCUMENTS

| | | | |
|---|---|---|---|
| CN | 101106519 | A | 1/2008 |
| CN | 101405989 | A | 4/2009 |
| CN | 107872387 | A | 4/2018 |
| CN | 108965090 | A | 12/2018 |
| EP | 1856849 | B1 | 6/2012 |
| JP | 2003258876 | | 9/2003 |
| JP | 2003258876 | A | 9/2003 |
| JP | 2008054026 | A | 3/2008 |
| JP | 2008-104237 | A | 5/2008 |
| JP | 2008219530 | | 9/2008 |
| JP | 2008219530 | A | 9/2008 |
| JP | 2014532368 | | 7/2010 |
| JP | 2014532368 | A | 12/2014 |

OTHER PUBLICATIONS

Jeng et al. (Covering Prefixes Outbound Route Filter for BGP-4; Mar. 6, 2015; IESG; pp. 0-19; https://www.ietf.org/archive/id/draft-ietf-bess-orf-covering-prefixes-06.txt) (Year: 2015).*
Extended European Search Report issued in corresponding European Patent Application No. 21795877.6 on Aug. 7, 2023; 11 pages.
Jeng et al. "Covering Prefixes Outbound Route Filter for BGP-4 draft-ietf-bess-orf-covering-prefixes-05", Internet Engineering Task Force, IETF; Standard Working Draft, Internet Society (ISOC) 4, Rue Des Falaises CH- 1205 Geneva, Switzerland, Mar. 6, 2015 (Mar. 6, 2015), pp. 1-20.
Japanese Office Action dated May 28, 2024 in JP Application No. 2022-566011, with English Translation, 6 pages.
Japanese Decision to Grant a Patent dated Sep. 6, 2024 in JP Application No. 2022-566011, with English Translation, 5 pages.
First Office Action for Application No. 202010360605.7 Dated Mar. 28, 2022, in Japanese and English Translation, 22 PAGES.
International Search Report issued on Aug. 2, 2021 in corresponding Application No. PCT/CN2021/090597; 2 pages.

* cited by examiner

ROUTING CONTROL METHOD AND APPARATUS, SYSTEM AND BORDER GATEWAY PROTOCOL PEER

CROSS-REFERENCE TO RELATED APPLICATIONS

The present disclosure is a U.S. National Stage Application under 35 U.S.C. § 371 of International Patent Application No. PCT/CN2021/090597, filed on Apr. 28, 2021, which is based on and claims priority of Chinese application for invention No. 202010360605.7 filed on Apr. 30, 2020, the disclosures of both of which are hereby incorporated into this disclosure by reference in its entirety.

TECHNICAL FIELD

The present disclosure relates to the field of communication technologies, and in particular, to a routing control method, an apparatus, a system, and a BGP Peer.

BACKGROUND

MPLS (Multi-Protocol Label Switching) VPN (Virtual Private Network) cross-domain networking can be implemented in Option A, Option B, and Option C modes. In VPN cross-domain networking scenarios, BGP (Border Gateway Protocol) Peers can advertise VPN routes.

Currently, in the Option A scenario, when an ASBR (Autonomous System Boundary Router) that acts as a BGP Peer receives a route sent from a BGP Peer(another ASBR) of another AS (Autonomous System), it searches in a corresponding VRF (Virtual Routing Forwarding) routing table based on an access link interface, and limits the number of VPN routes of a VPN instance on the BGP Peer of the another AS according to the VRF routing table. This can prevent the VPN instance from having too many VPN routes, occupying too many management and storage resources, and affecting the sending and receiving of VPN routes of other VPN instances.

SUMMARY

According to some embodiments of the present disclosure, a routing control method is provided, wherein the routing control method is executed by a first Border Gateway Protocol (BGP) Peer, comprising: receiving information of adding a new Virtual Private Network (VPN) route sent from a second BGP Peer, wherein the information of adding the new VPN route comprises: the new VPN route and an identifier of a first VPN instance corresponding to the new VPN route; determining whether a number of VPN routes corresponding to the identifier of the first VPN instance reaches or exceeds a limit value after adding the new VPN route according to the identifier of the first VPN instance; and sending first instruction information to the second BGP Peer to instruct the second BGP Peer to stop adding a VPN route corresponding to the identifier of the first VPN instance, in a case that the number of VPN routes corresponding to the identifier of the first VPN instance reaches or exceeds the limit value, wherein the first BGP Peer is an internal Border Gateway Protocol (iBGP) Peer inside a first Autonomous System (AS).

In some embodiments, the second BGP Peer is a BGP Peer at a border of the first AS and serves as an eBGP (external Border Gateway Protocol) Peer of the first AS and the second AS.

In some embodiments, the identifier of the first VPN instance is a first Route Distinguisher (RD), and determining whether the number of VPN routes corresponding to the identifier of the first VPN instance reaches or exceeds the limit value after adding the new VPN route according to the identifier of the first VPN instance comprises: identifying the first RD comprised in the new VPN route; determining a first Virtual Routing Forwarding (VRF) routing table corresponding to the new VPN route according to a Route Target (RT) of the new VPN route, and removing the first RD from the new VPN route; adding the new VPN route having the first RD removed to the first VRF routing table according to the RT of the new VPN route; and determining whether the number of routing entries in the first VRF routing table reaches or exceeds the limit value.

In some embodiments, the identifier of the first VPN instance is a first Route Distinguisher (RD), the first instruction information is a first Route Refresh message, and sending first instruction information to the second BGP Peer comprises: setting a first Outband Router Filtering (ORF) entry in the first Route Refresh message; setting a value of an Action field of the first ORF entry to a first value to indicate that a filtering condition corresponding to the first ORF entry should be added to an outbound route filter of the second BGP Peer; setting a value of a Match field of the first ORF entry to a second value to indicate that an addition of a VPN route matching the first ORF entry will be denied; and adding the first RD to a Type-specific-part field of the first ORF entry.

In some embodiments, the method further comprises: receiving information of withdrawing a VPN Route to be withdrawn sent from the second BGP Peer, wherein the information of withdrawing the VPN Route to be withdrawn comprises: the VPN route to be withdrawn and an identifier of a second VPN instance corresponding to the VPN route to be withdrawn; deleting the VPN route to be withdrawn according to the identifier of the second VPN instance; determining whether the number of VPN routes corresponding to the identifier of the second VPN instance is less than the limit value after deleting the VPN route to be withdrawn, in a case that a number of VPN routes corresponding to the identifier of the second VPN instance reaches or exceeds the limit value; and sending second instruction information to the second BGP Peer to instruct that the second BGP Peer is permit to add a VPN route corresponding to the identifier of the second VPN instance, in a case that the number of VPN routes corresponding to the identifier of the second VPN instance is less than the limit value.

In some embodiments, the identifier of the second VPN instance is a second RD, the second instruction information is a second Route Refresh message, and sending the second instruction information to the second BGP Peer comprises: setting a second ORF entry in the second Route Refresh message; setting a value of an Action field of the second ORF entry to a third value to indicate that a configured filtering condition corresponding to the second ORF entry should be deleted from an outbound route filter of the second BGP Peer; and adding the second RD to a Type-specific-part field of the second ORF entry.

In some embodiments, an Address Family Identifier (AFI) field and a Subsequent Address Family Identifier (SAFI) field in the first Route Refresh message are respectively set to an AFI value and a SAFI value of a first Virtual Routing Forwarding (VRF) routing table corresponding to the first RD; a When-to-Refresh field of the first Route Refresh message is set to a value which represents "IMMEDIATE"; or an ORF-Type field corresponding to the first ORF entry in the first Route Refresh message is set to a preset value which represents a new ORF type.

In some embodiments, an AFI field and a SAFI field in the second Route Refresh message are respectively set to an AFI value and a SAFI value of a second VRF routing table corresponding to the second RD; a When-to-Refresh field of the second Route Refresh message is set to a value which represents "IMMEDIATE"; or an ORF-Type field corresponding to the second ORF entry in the second Route Refresh message is set to a preset value which represents a new ORF type.

According to still other embodiments of the present disclosure, a routing control method is provided, wherein the routing control method is executed by a second Border Gateway Protocol (BGP) Peer, comprising: sending information of adding a new Virtual Private Network (VPN) route to a first BGP Peer, wherein the information of adding the new VPN route comprising: the new VPN route and an identifier of a first VPN instance corresponding to the new VPN route; receiving first instruction information sent from the first BGP Peer, in a case that the first BGP Peer determines that a number of VPN routes corresponding to the identifier of the first VPN instance reaches or exceeds a limit value, wherein the first instruction information is used to instruct the second BGP Peer to stop adding a VPN route corresponding to the identifier of the first VPN instance; and stopping adding the VPN route corresponding to the identifier of the first VPN instance to the first BGP Peer according to the first instruction information, wherein the first BGP Peer is an internal Border Gateway Protocol (iBGP) Peer.

In some embodiments, the second BGP Peer is a BGP Peer at a border of the first AS and serves as an external Border Gateway Protocol (eBGP) Peer of the first AS and a second AS.

In some embodiments, the method further comprises: sending the first instruction information to a third BGP Peer to instruct the third BGP Peer to stop adding the VPN route corresponding to the identifier of the first VPN instance, wherein the third BGP Peer is an eBGP Peer of the second AS; and sending, from the third BGP Peer, the first instruction information to a fourth BGP Peer to instruct the fourth BGP Peer to stop adding the VPN route corresponding to the identifier of the first VPN instance, wherein the fourth BGP Peer is an iBGP Peer inside the second AS.

In some embodiments, the identifier of the first VPN instance is a first RD, the first instruction information is a first Route Refresh message, and stopping adding the VPN route corresponding to the identifier of the first VPN instance to the first BGP Peer according to the first instruction information comprises: adding a filtering condition for filtering out the VPN route corresponding to the identifier of the first VPN instance in an outbound route filter according to a first Outband Router Filtering (ORF) entry in the first Route Refresh message, wherein the first ORF entry comprises the first RD; and filtering out a BGP update message comprising the VPN route corresponding to the identifier of the first VPN instance according to the filtering condition.

In some embodiments, adding the filtering condition for filtering out the VPN route corresponding to the identifier of the first VPN instance in the outbound route filter according to the first ORF entry in the first Route Refresh message comprises: parsing the first ORF entry having an ORF-Type field set to a preset value in the first Route Refresh message, wherein the preset value represents a new ORF type; parsing an Action field in the first ORF entry to obtain a first value indicating that the filtering condition should be added in the outbound route filter of the second BGP Peer; parsing a Match field of the first ORF entry to obtain a second value indicating that an addition of a VPN route matching the first ORF entry will be denied; parsing a Type-specific-part field of the first ORF entry to obtain the first RD; and adding the filtering condition for filtering out the BGP update message comprising the VPN route corresponding to the first RD in the outbound route filter, according to the first value, the second value and the first RD.

In some embodiments, the method further comprises: sending information of withdrawing a VPN Route to be withdrawn to the first BGP Peer, wherein the information of withdrawing the VPN Route to be withdrawn comprises: the VPN route to be withdrawn and an identifier of a second VPN instance corresponding to the VPN route to be withdrawn; receiving second instruction information sent from the first BGP Peer, wherein the second instruction information represents that the first BGP Peer determines that a number of VPN routes corresponding to the identifier of the second VPN instance is less than the limit value after deleting the VPN route to be withdrawn, and is used to instruct that the second BGP Peer is permit to add a VPN route corresponding to the identifier of the second VPN instance; and stopping filtering of a message for adding the VPN route corresponding to the identifier of the second VPN instance according to the second instruction information.

In some embodiments, the identifier of the second VPN instance is a second RD, the second instruction information is a second Route Refresh message, and stopping filtering of the message for adding the VPN route corresponding to the identifier of the second VPN instance according to the second instruction information comprises: deleting a configured filtering condition corresponding to a second ORF entry in an outband route filter according to the second ORF entry in the second Route Refresh message, to pass a BGP update message comprising the VPN route corresponding to the identifier of the second VPN instance, wherein the second ORF entry comprises the second RD.

In some embodiments, deleting the configured filtering condition corresponding to the second ORF entry in the outbound route filter according to the second ORF entry in the second Route Refresh message comprises: parsing the second ORF entry having an ORF-Type field set to a preset value in the second Route Refresh message, wherein the preset value represents a new ORF; parsing an Action field of the second ORF entry to obtain a third value instructing that the configured filtering condition corresponding to the second ORF entry should be deleted from the outbound route filter of the second BGP Peer; and deleting the configured filtering condition corresponding to the second ORF entry from the outbound route filter according to the third value.

According to still other embodiments of the present disclosure, a Border Gateway Protocol (BGP) Peer is provided, comprising: a processor; and a memory coupled to the processor for storing instructions, which when executed by the processor, cause the processor to execute the routing control method according to the routing control method execute by the first BGP Peer of any one of the foregoing embodiments.

According to still other embodiments of the present disclosure, a Border Gateway Protocol (BGP) Peer is provided, comprising: a processor; and a memory coupled to the processor for storing instructions, which when executed by the processor, cause the processor to execute the routing control method according to the routing control method execute by the second BGP Peer of any one of the foregoing embodiments.

According to still other embodiments of the present disclosure, a routing control system, comprising: the first BGP Peer the first BGP Peer; and a second BGP Peer configure to send information of adding a new Virtual Private Network (VPN) route to a first BGP Peer, wherein the information of adding the new VPN route comprising: the new VPN route and an identifier of a first VPN instance corresponding to the new VPN route; receive first instruction information sent from the first BGP Peer, in a case that the first BGP Peer determines that a number of VPN routes corresponding to the identifier of the first VPN instance reaches or exceeds a limit value, wherein the first instruction information is used to instruct the second BGP Peer to stop adding a VPN route corresponding to the identifier of the first VPN instance; and stop adding the VPN route corresponding to the identifier of the first VPN instance to the first BGP Peer according to the first instruction information, wherein the first BGP Peer is an internal Border Gateway Protocol (iBGP) Peer.

In some embodiments, the system further comprise: a third BGP Peer and a fourth BGP Peer, wherein: the second BGP Peer is further configured to send the first instruction information to the third BGP Peer to instruct the third BGP Peer to stop adding the VPN route corresponding to the identifier of the first VPN instance, wherein the third BGP Peer is an eBGP Peer of the second AS; the third BGP Peer is configured to receive the first instruction information sent from the second BGP Peer; stopping adding the VPN route corresponding to the identifier of the first VPN instance according to the first instruction information to the second BGP Peer; and send the first instruction information to the fourth BGP Peer to instruct the fourth BGP Peer to stop adding the VPN route corresponding to the identifier of the first VPN instance, wherein the fourth BGP Peer is an iBGP Peer inside the second AS; and the fourth BGP Peer is configured to receive the first instruction information sent from the third BGP Peer, and stopping adding the VPN route corresponding to the identifier of the first VPN instance according to the first instruction information to the third BGP Peer.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute a part of this specification, illustrate embodiments of the invention, and together with the illustrative embodiments of the present application serve to explain the present disclosure, but are not limitation thereof.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by those of ordinary skill in the art based on the embodiments of the present disclosure without creative efforts shall fall within the protection scope of the present disclosure.

The inventor has found that in the scenario of Option B, there is on VRF table configured on an ASBR, and in the scenario of Option C, the RR (Router Reflector) does not process VPN information. Therefore, in the scenarios of Option B and Option C, it is currently impossible to limit a number of VPN routes, which may lead to an excessive number of VPN routes of a VPN instance, affecting the sending and receiving of VPN routes of other VPN instances.

A technical problem to be solved by the present disclosure is in the scenarios of Option B and Option C, how to limit the number of VPN routes of a VPN instance.

The present disclosure provides a routing control method, which will be described below with reference to FIG. 1.

Figure 1:
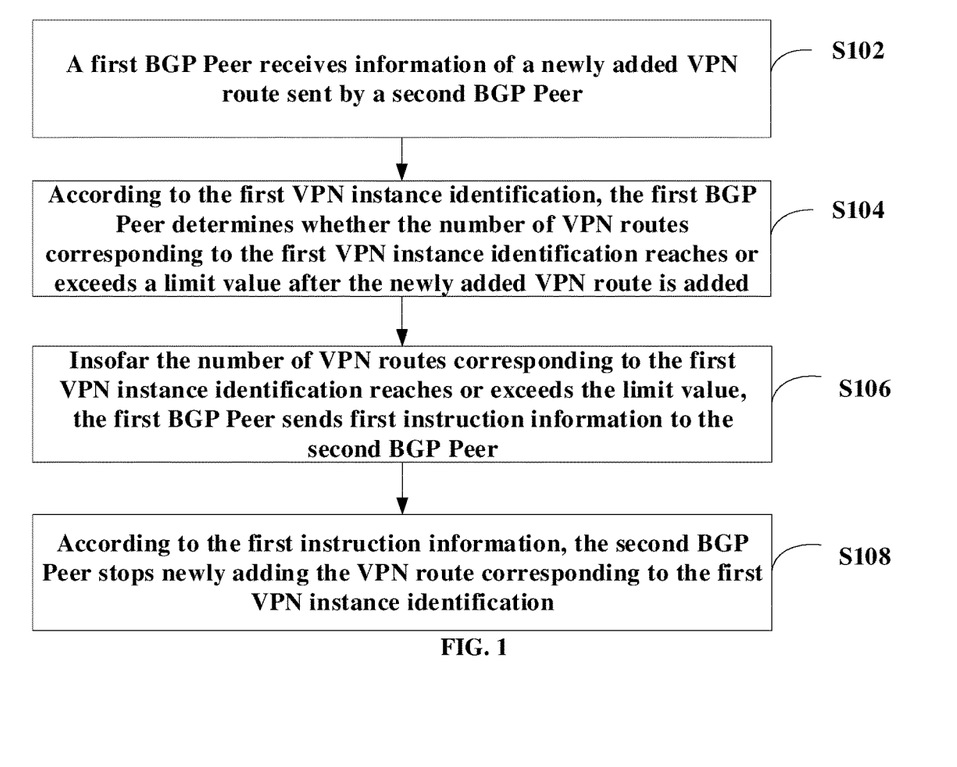
FIG. 1 shows a schematic flowchart of a routing control method according to some embodiments of the present disclosure.

FIG. 1 is a flowchart of some embodiments of the routing control method of the present disclosure. As shown in FIG. 1, the method of these embodiments comprises: steps S102 to S108. In this embodiment, the first BGP Peer may be an iBGP Peer (internal Border Gateway Protocol Peer) inside a first AS, for example, a PE. The second BGP Peer may be a BGP Peer at a border of the first AS, serving as an eBGP Peer (external Border Gateway Protocol Peer) between the first AS and a second AS, and an iBGP Peer, together with the first BGP Peer, inside the first AS.

In step S102, the second BGP Peer sends information of adding a new VPN route to the first BGP Peer, correspondingly, the first BGP Peer receives the information of adding the new VPN route sent from the second BGP Peer.

The information of adding the new VPN route may comprise: the new VPN route and an identifier of a first VPN instance corresponding to the new VPN route. The identifier of the first VPN instance may be a first RD (Route Distinguisher), which is comprised in the new VPN route and may be used as an extended prefix of a destination address in the new VPN route. In the Option A scenario, a route exchanged between ASBRs does not carry a RD. In the Option B and Option C scenarios, a VPN route carries a RD. The RD can be used to limit the number of VPN routes in a simple and convenient way that is compatible with the existing technology. Of course, a new identifier of a VPN instance other than the RD may also be set to uniquely identify the VPN instance, but not limited to the examples given herein. In the subsequent embodiments, as an example, a description will be given with the RD as the identifier of the VPN instance.

The information of adding the new VPN route may be a BGP Update message. The BGP Update message may comprise an NLRI (Network Layer Reachability Information) field, and the new VPN route may be carried in this field.

In some embodiments, In the Option B scenario, the second BGP Peer is an ASBR, and in the Option C scenario, the second BGP Peer is a RR, that is, the second BGP peer can be the BGP peer at the border of the first AS, and serves as the eBGP Peer of the first AS and the second AS.

In step S104, the first BGP Peer determines whether the number of VPN routes corresponding to the identifier of the first VPN instance reaches or exceeds a limit value after adding the new VPN route according to the identifier of the first VPN instance.

The limit value may be set according to an actual processing capability of the first BGP Peer. In some embodiments, the first BGP Peer identifies the first RD in the new VPN route, determines a first VRF routing table corresponding to the new VPN route according to a RT (Route Target) of the new VPN route, removes the first RD from the new VPN route, adds the new VPN route having the first RD removed to the first VRF routing table according to the RT of the new VPN route, and determines whether the number of routing entries in the first VRF routing table reaches or exceeds the limit value.

The first RD can be used as an extended prefix of the destination address in the new VPN route. The first BGP Peer can identify the first RD, and can determine the first VRF routing table corresponding to the new VPN route according to the RT of the new VPN route. The RT is also used to determine whether to add the new VPN route to the first VRF routing table. The first BGP Peer adds the VPN route having the first RD removed to the first VRF routing table, and determines whether the routing entries in the first VRF routing table reach or exceed the limit value. For the process of adding the new VPN route to the first VRF routing table, reference may be made to the implementations in the prior art.

In step S106, the first BGP Peer sends first instruction information to the second BGP Peer to instruct the second BGP Peer to stop adding a VPN route corresponding to the identifier of the first VPN instance, in a case that the number of VPN routes corresponding to the identifier of the first VPN instance reaches or exceeds the limit value, and the second BGP Peer receives the first instruction information sent from the first BGP Peer accordingly.

In the Option A scenario, an ASBR can indicate to a peer that the number of routes has reached or exceeded a limit value through a BGP Notification message. In the present disclosure, the inventor recognized that the ASBR or RR cannot implement a subsequent process of filtering (i.e., stop adding) VPN routes of the VPN instance according to a BGP Notification message in the scenarios of Option B and Option C. Therefore, an existing standard Route Refresh message is improved to control the number of VPN routes of the VPN instance. The structure of the Route Refresh message is defined in relevant standards such as RFC5291.

The first instruction information may be a Route Refresh message. The present disclosure improves this message to realize the control of the number of VPN routes of the VPN instance in Option B and Option C scenarios. The Route Refresh message comprises one or more ORF (Outband Router Filtering) Entries. A BGP peer, as a BGP speaker, sends the one or more ORF Entries to another BGP peer, so that the another BGP peer can use a filter corresponding to the ORF Entries to pass or filter out BGP update messages sent to the BGP speaker. The first BGP Peer may set a first ORF entry carrying the first RD in the first Route Refresh message, and send it to the second BGP Peer, so that the second BGP Peer can stop adding the VPN route corresponding to the first RD according to the first ORF entry. Table 1 shows the structure of the Route Refresh message, in which ORF Entries are carried.

TABLE 1

| |
| --- |
| AFI (2 octets) |
| Reserved (1 octet) |
| SAFI (1 octet) |
| When-to-refresh (1 octet) |
| ORF Type (1 octet) |
| Length of ORF entries (2 octets) |
| First ORF entry |
| . . . |
| N-th ORF entry |
| ORF Type (1 octet) |
| Length of ORF entries (2 octets) |
| First ORF entry |
| . . . |

As shown in Table 1, AFI (Address Family Identifier), SAFI (Subsequent Address Family Identifier), Reserved, When-to-refresh belong to a common part. The Route Refresh message may comprise one or more ORF Types, and each of the one or more ORF Types may correspond to one or more ORF Entries. According to the order of the fields in Table 1, how to configure the various fields in order to control the number of VPN routes corresponding to the first VPN instance will be described below.

For the AFI and SAFI fields, for example, they are respectively set to an AFI value and a SAFI value of the first VRF routing table corresponding to the first RD.

For the When-to-refresh field, for example, it is set to a value which represents "IMMEDIATE". Since the When-to-refresh field can be configured with two values corresponding to "IMMEDIATE" and "DEFER", the When-to-refresh field can be set to a value corresponding to "IMMEDIATE" when the number of VPN routes of the first VPN instance needs to be controlled.

For the ORF Type field, the ORF Type used in the present disclosure to control the number of VPN routes of the first VPN instance is a new type compared to the ORF types in the existing standard (for example, CP-ORF ("Covering Prefixes ORF")). Thus, the ORF-Type field corresponding to the first ORF Entry in the first Route Refresh message can be set to a preset value which represents a new ORF type.

The Length of ORF entries field refers to a total length (in octets) of all ORF Entries corresponding to an ORF type. The Length of ORF entries can be configured according to the actual situation.

For each ORF Entry field, the structure of the ORF Entry is defined in existing standards. Specifically, as shown in Table 2, an ORF Entry comprises four fields: Action, Match, Reserved and Type-specific-part.

TABLE 2

| |
| --- |
| Action (2 bit) |
| Match (1 bit) |
| Reserved (5 bits) |
| Type specific part (variable) |

According to the order of the fields in Table 2, how to configure the various fields of the first ORF Entry in order to control the number of VPN routes of the first VPN instance will be described below.

For the Action field, for example, a value of the Action field of the first ORF entry is set to a first value to indicate that a filtering condition corresponding to the first ORF entry should be added to an outbound route filter of the second BGP Peer. In the existing standards, the value of the Action field is set to 0 for "ADD", 1 for "REMOVE", and 2 for "REMOVE-ALL". Thus, if the number of VPN routes of the first VPN instance needs to be controlled, the Action field can be set to 0.

For the Match field, for example, a value of a Match field of the first ORF entry is set to a second value o indicate that an addition of a VPN route matching the first ORF entry will be denied. In the existing standards, the value of the Match field is set to 0 for "PERMIT", and 1 for "DENY". Thus, if the number of VPN routes of the first VPN instance needs to be controlled, the Match field can be set to 1. If VPN routes of the first VPN instance needs to be passed, the Match field can be set to 0.

For the Type-specific-part field, the first RD may be added to the Type-specific-part field in the first ORF entry, for example, the first RD occupies 8 Bytes. For a specific structure of the Type-specific-part field, reference can be made to the existing standards, which may comprise fields such as Sequence, Reserved, etc., and these existing fields will not be repeated herein.

Through the specific configuration of the first Route Refresh message, the first BGP peer can instruct the second BGP peer to configure the filtering condition corresponding to the first ORF entry in the first Route Refresh message to filter BGP update messages corresponding to the first RD carried in the first Route Refresh message.

In step S108, the second BGP Peer stops adding the VPN route corresponding to the identifier of the first VPN instance to the first BGP Peer, according to the first instruction information.

In some embodiments, the second BGP Peer adds a filtering condition for filtering out a VPN route corresponding to the identifier of the first VPN instance in the outbound route filter according to the first ORF entry in the first Route Refresh message. The second BGP Peer filters out a BGP update message comprising a VPN route corresponding to the identifier of the first VPN instance in the NLRI field according to the filtering condition. The VPN route can be carried in the NLRI field of the BGP update message.

Further, based on the configuration method of the first Route Refresh message in the above embodiment, the second BGP Peer can parse the first Route Refresh message, obtain the values of it various fields, so as to configure the filtering condition for filtering the VPN route corresponding to the identifier of the first VPN instance. In some embodiments, the second BGP Peer parses the AFI and SAFI field to obtain the AFI value and the SAFI value that belong to the first VRF routing table corresponding to the first RD, and set the corresponding AFI and SAFI fields in the filtering condition according the AFI value and the SAFI value. According to the corresponding AFI and SAFI fields of the filtering condition, the second BGP Peer can subsequently filter a BGP update message carrying a VPN route matching the values of the AFI and SAFI fields. The second BGP peer can parse the When-to-refresh field to obtain a value which represents "IMMEDIATE", and execute filtering immediately after setting the filtering condition. The second BGP peer can parse the ORF Type field to obtain the preset value, and determine the type of a subsequent ORF entry. The second BGP Peer can parse the Length flied of the ORF entry to obtain a corresponding length value, which facilitates an accurate parsing of the subsequent ORF entry.

Further, the second BGP Peer parses the first ORF entry having an ORF-Type field set to a preset value in the first Route Refresh message, parses the Action field in the first ORF entry to obtain the first value indicating that the filtering condition corresponding to the first ORF entry should be added in the outbound route filter of the second BGP Peer, parses the Match field of the first ORF entry to obtain the second value indicating that an addition of a VPN route matching the first ORF entry will be denied, parses the Type-specific-part field of the first ORF entry to obtain the first RD, and adds the filtering condition for filtering out the BGP update message comprising the VPN route corresponding to the first RD in the outbound route filter, according to the first value, the second value and the first RD. When the second BGP peer has a BGP update message that needs to be sent to the first BGP peer, and the RD carried in the VPN route in the NLRI field of the BGP update message is the same as the first RD of the filtering condition, the second BGP peer will filter out the BGP update, that is, stop sending the VPN route corresponding to the first RD to the first BGP Peer.

In the method of the above embodiment, the first BGP peer receives the information of adding the new VPN route sent from the second BGP peer, and determines whether the number of VPN routes corresponding to the identifier of the first VPN instance reaches or exceeds the limit value after adding the new VPN route according to the identifier of the first VPN instance. If the number of VPN routes corresponding to the identifier of the first VPN instance reaches or exceeds the limit value, the first BGP peer instructs the second BGP Peer to stop adding the VPN route corresponding to the identifier of the first VPN instance. In this disclosure, the first BGP Peer is the iBGP Peer inside the first AS, such as a PE. That is, in the present disclosure, instead of using an ASBR or RR at the border of the first AS in Option B and Option C, the number of VPN routes can be counted and determined through a router inside the AS, so that the functions of the ASBR or RR in Option B and Option C are not changed, thereby ensuring the compatibly with the existing technology.

Further, the identifier of the first VPN instance is carried in the information of adding the VPN route. The first BGP peer can achieve real-time statistics and determination on the number of VPN routes corresponding to the first VPN instance according to the identifier of the first VPN instance, and instruct the second BGP Peer to stop adding the VPN route corresponding to the identifier of the first VPN instance, so as to limit the number of routes corresponding to the first VPN instance, thereby reducing resources of the first BGP Peer occupied by the routes of the first VPN instance, as well as the impact on the sending and receiving of VPN routes corresponding to other VPN instances, resulting in a flexible and controllable VPN networking solution.

The method in the above embodiment is applicable to the scenarios of Option B and Option C. An ASBR in Option B or a RR in Option C can be used as the second BGP peer, and the outbound route filter is configured according to the first Route Refresh message of the first BGP peer, so as to control the number of VPN routes corresponding to the first VPN instance based on the first RD (identifier of first VPN instance).

Other embodiments of the routing control method of the present disclosure will be described below with reference to FIG. 2.

Figure 2:
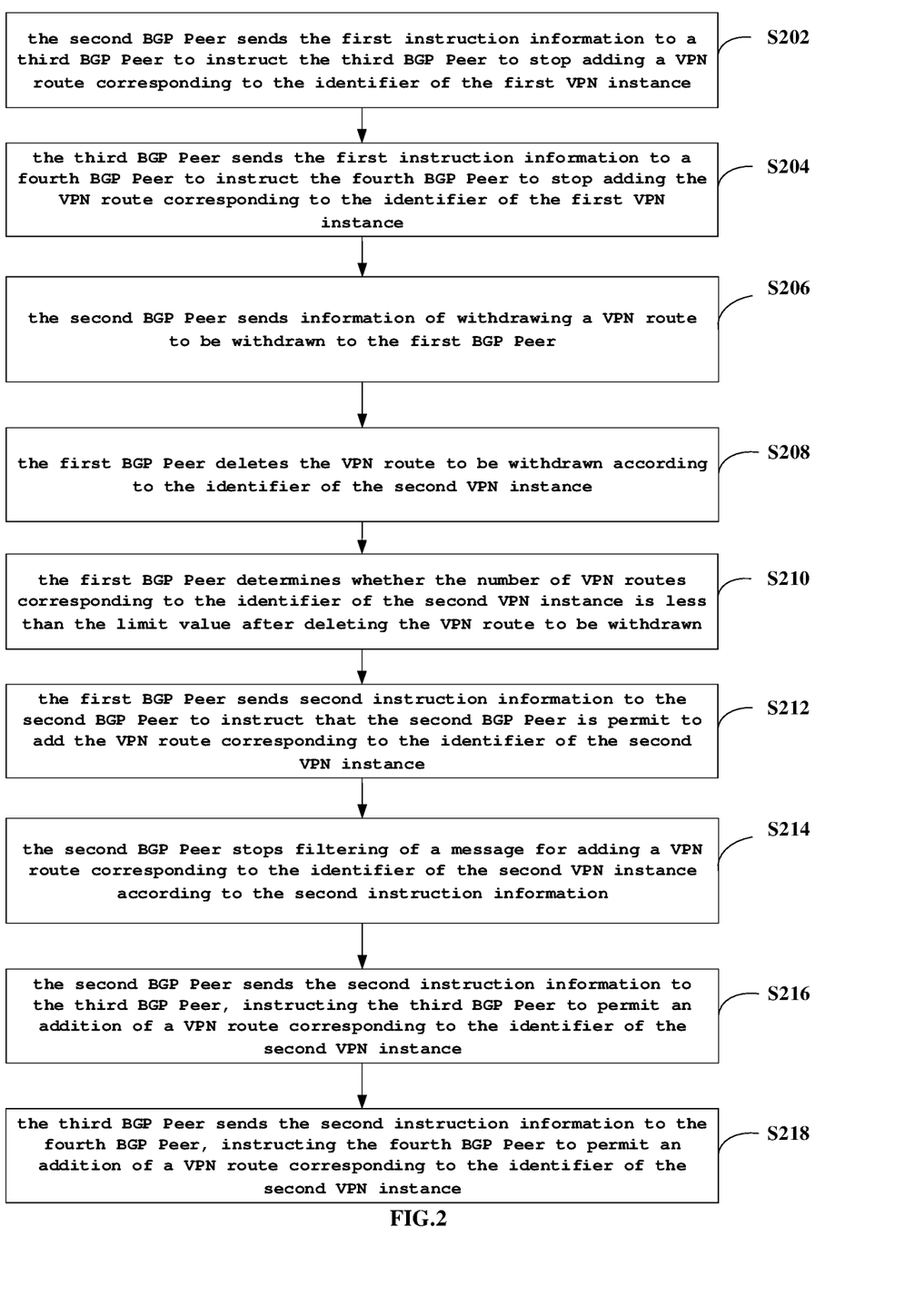
FIG. 2 shows a schematic flowchart of a routing control method according to other embodiments of the present disclosure.

FIG. 2 is a flowchart of other embodiments of the routing control method of the present disclosure. As shown in FIG. 2, after step S108, the method further comprises steps S202 to S218. The second BGP Peer may be a BGP Peer at the border of the first AS, serving as an eBGP Peer of the first AS and a second AS.

In step S202, the second BGP Peer sends the first instruction information to a third BGP Peer to instruct the third BGP Peer to stop adding a VPN route corresponding to the identifier of the first VPN instance. The third BGP Peer is, for example, an eBGP Peer of the second AS. That is, the third BGP Peer may be an ASBR in Option B or a RR in Option C.

For the first instruction information, reference can be made to the foregoing embodiment. The third BGP Peer stops adding the VPN route corresponding to the identifier of the first VPN instance to the second BGP Peer according to the first instruction information.

In step S204, the third BGP Peer sends the first instruction information to a fourth BGP Peer to instruct the fourth BGP Peer to stop adding the VPN route corresponding to the identifier of the first VPN instance. The fourth BGP Peer is an iBGP peer inside the second AS, for example, a PE. The fourth BGP Peer stops adding the VPN route corresponding to the identifier of the first VPN instance to the third BGP Peer according to the first instruction information.

The fourth BGP Peer may be a source node sending the information of adding the VPN route (for example, a BGP update message). After the fourth BGP Peer sends the information of adding the VPN route, it is transmitted to first BGP peer inside the first AS through the third BGP Peer and the second BGP Peer. The first BGP peer sends the first instruction information to the second, third, and fourth BGP peers, so that each BGP peer on the entire transmission path can limit the number of VPN routes of the first VPN instance, and can reduce a generation probability of routing black holes.

In step S206, the second BGP Peer sends information of withdrawing a VPN route to be withdrawn to the first BGP Peer; correspondingly, the first BGP Peer receives the information of withdrawing the VPN route to be withdrawn sent from the second BGP Peer.

The information of withdrawing the VPN route to be withdrawn may comprise: the VPN route to be withdrawn and an identifier of a second VPN instance corresponding to the VPN route to be withdrawn. The identifier of the second VPN instance may be a second RD. The information of withdrawing the VPN route to be withdrawn may be a BGP Update message, which may comprise a Withdrawn Routes field that comprises the VPN route to be withdrawn.

In step S208, the first BGP Peer deletes the VPN route to be withdrawn according to the identifier of the second VPN instance.

The first BGP peer can identify the second RD, determine a corresponding second VRF routing table according to the second RD, remove the second RD from the VPN route to be withdrawn, search for the VPN route to be withdrawn having the second RD removed in the second VRF routing table, and then delete the VPN route to be withdrawn having the second RD removed that has been found.

In step S210, the first BGP Peer determines whether the number of VPN routes corresponding to the identifier of the second VPN instance is less than the limit value after deleting the VPN route to be withdrawn, in a case that the number of VPN routes corresponding to the identifier of the second VPN instance reaches or exceeds the limit value.

After deleting the VPN route to be withdrawn, the first BGP Peer compares the number of route entries in the second VRF routing table with the limit value to determine whether it is less than the limit value.

In step S212, the first BGP Peer sends second instruction information to the second BGP Peer to instruct that the second BGP Peer is permit to add the VPN route corresponding to the identifier of the second VPN instance, in a case that the number of VPN routes corresponding to the identifier of the second VPN instance is less than the limit value, and the second BGP Peer receives the second instruction information sent from the first BGP Peer accordingly.

For example, the first BGP Peer sends the second instruction information to the second BGP Peer when it is determined that no oscillation will occur. An indication can also be manually sent to the first BGP Peer, indicating the determination that no oscillation will occur, so that the first BGP Peer sends the second instruction information to the second BGP Peer. This is to prevent the number of VPN routes sent from the second BGP peer from repeatedly oscillating around the limit value, in which case the first BGP peer will repeatedly send the first instruction information and the second instruction information to the second BGP peer, causing waste of resources accordingly.

The second instruction information may be a second Route Refresh message. The first BGP Peer may set a second ORF entry carrying the identifier of the second VPN instance (for example, the second RD) in the second Route Refresh message, and send it to the second BGP Peer, so that the second BGP Peer can pass information of adding a VPN route corresponding to the identifier of the second VPN instance according to the second ORF entry.

Referring to Table 1 and Table 2, the various fields can be set as follows for the implementation of the second instruction message.

For the AFI and SAFI fields, for example, they are respectively set to an AFI value and a SAFI value of the second VRF routing table corresponding to the second RD.

For the When-to-refresh field, for example, it is set to a value which represents "IMMEDIATE". The When-to-refresh field can be set to the value which represents "IMMEDIATE".

For the ORF-Type field, for example, the ORF-Type field corresponding to the second ORF Entry can be set to a preset value which represents a new ORF type.

For the Length of ORF entries, it can be set according to an actual situation.

The various fields in the second ORF entry can be set as follows.

For the Action field, for example, the value of the Action field of the second ORF entry is set to a third value indicating that a configured filtering condition corresponding to the second ORF entry should be deleted from the outbound route filter of the second BGP Peer. For example, the Action field can be set to 1 (representing "REMOVE"). If the second BGP peer is asked to resend all the VPN routes, the Action field can be set to 2 (representing "REMOVE ALL"). For the Type-specific-part field, the second RD may be added to the Type-specific-part field in the second ORF entry, for example, the second RD occupies 8 Bytes. For the specific structure of the Type-specific-part field, reference can be made to the existing standards, which may comprise fields such as Sequence, Reserved, etc., and these existing fields will not be repeated herein.

In step S214, the second BGP Peer stops filtering of a message for adding a VPN route corresponding to the identifier of the second VPN instance according to the second instruction information.

In some embodiments, the second BGP Peer deletes a configured filtering condition corresponding to the second ORF entry in the outband route filter according to the second ORF entry in the second Route Refresh message, to pass a BGP update message comprising a VPN route corresponding to the identifier of the second VPN instance, wherein the second ORF entry comprises the second RD.

Further, the second BGP Peer parses the second ORF entry having the ORF-Type field set to the preset value in the second Route Refresh message, and parses the Action field of the second ORF entry to obtain the third value instructing that the configured filtering condition corresponding to the second ORF entry should be deleted from the outbound route filter of the second BGP Peer; deletes the configured filtering condition corresponding to the second ORF entry from the outbound route filter according to the third value. For the parsing of other fields, reference can be made to the foregoing embodiment, and the values obtained after parsing the other fields can be used to search for a corresponding filter condition in the outbound route filter.

In step S216, the second BGP Peer sends the second instruction information to the third BGP Peer, instructing the third BGP Peer to permit an addition of a VPN route corresponding to the identifier of the second VPN instance. The third BGP Peer is an eBGP Peer of the second AS. The third BGP Peer may be an ASBR in Option B or a RR in Option C. According to the second instruction information, the third BGP Peer stops filtering of a message for adding a VPN route corresponding to the identifier of the second VPN instance.

In step S218, the third BGP Peer sends the second instruction information to the fourth BGP Peer, instructing the fourth BGP Peer to permit an addition of a VPN route corresponding to the identifier of the second VPN instance. The fourth BGP Peer is an iBGP peer inside the second AS. According to the second instruction information, the fourth BGP Peer stops filtering of a message for adding a VPN route corresponding to the identifier of the second VPN instance. The first BGP peer sends the second instruction information to the second, third, and fourth BGP peers, so that each BGP peer on the entire transmission path can restore the update of a VPN route corresponding to the identifier of the second VPN instance.

In the method of the above embodiment, under the condition that the number of routes corresponding to the identifier of the second VPN instance does not exceed the limit value, each BGP peer can restore the update and addition of a VPN routes corresponding to the identifier of the second VPN instance. A flexible VPN route control is achieved based on the identifier of the second VPN instance (e.g., a RD) and the second Route Refresh message, which is applicable to Option B and Option C scenarios, compatible with existing technologies, and is flexible and extensible.

The present disclosure further provides a BGP peer, which will be described below with reference to FIG. 3.

Figure 3:
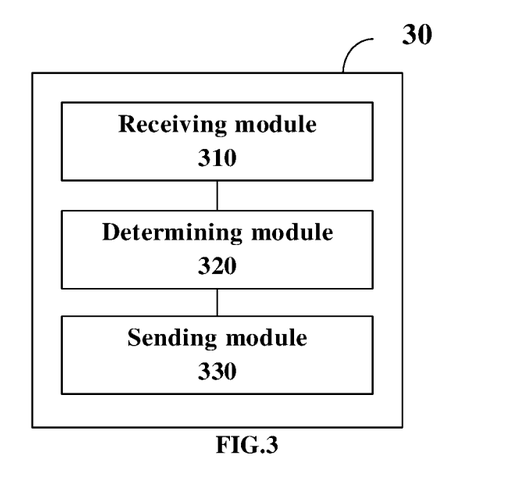
FIG. 3 shows a schematic structural diagram of a BGP Peer according to some embodiments of the present disclosure.

FIG. 3 is a structure diagram of some embodiments of the BGP peer of the present disclosure. As shown in FIG. 3, the BGP peer 30 of this embodiment may serve as a first BGP peer 30, and comprises: a receiving module 310, a determining module 320, and a sending module 330. The first BGP Peer is an iBGP Peer inside a first AS. A second BGP Peer is a BGP Peer at a border of the first AS, which serves as an eBGP Peer of the first AS and a second AS.

The receiving module 310 is configured to receive information of adding a new Virtual Private Network (VPN) route sent from a second BGP Peer, wherein the information of adding the new VPN route comprises: the new VPN route and an identifier of a first VPN instance corresponding to the new VPN route.

The determining module 320 is configured to determine whether a number of VPN routes corresponding to the identifier of the first VPN instance reaches or exceeds a limit value after adding the new VPN route according to the identifier of the first VPN instance.

In some embodiments, the identifier of the first VPN instance is a first RD. The determining module 320 is configured to identify the first RD comprised in the new VPN route; determine a first Virtual Routing Forwarding (VRF) routing table corresponding to the new VPN route according to a Route Target (RT) of the new VPN route, and removing the first RD from the new VPN route; add the new VPN route having the first RD removed to the first VRF routing table according to the RT of the new VPN route; and determine whether the number of routing entries in the first VRF routing table reaches or exceeds the limit value.

The sending module 330 is configured to send first instruction information to the second BGP Peer to instruct the second BGP Peer to stop adding a VPN route corresponding to the identifier of the first VPN instance, in a case that the number of VPN routes corresponding to the identifier of the first VPN instance reaches or exceeds the limit value.

In some embodiments, the first instruction information is a first Route Refresh message, in which a first ORF entry is set; a value of an Action field of the first ORF entry is set to a first value to indicate that a filtering condition corresponding to the first ORF entry should be added to an outbound route filter of the second BGP Peer; a value of a Match field of the first ORF entry is set to a second value to indicate that an addition of a VPN route matching the first ORF entry will be denied; the first RD is added to a Type-specific-part field of the first ORF entry.

In some embodiments, the receiving module 310 is configured to receive information of withdrawing a VPN Route to be withdrawn sent from the second BGP Peer, wherein the information of withdrawing the VPN Route to be withdrawn comprises: the VPN route to be withdrawn and an identifier of a second VPN instance corresponding to the VPN route to be withdrawn; delete the VPN route to be withdrawn according to the identifier of the second VPN instance; determine whether the number of VPN routes corresponding to the identifier of the second VPN instance is less than the limit value after deleting the VPN route to be withdrawn, in a case that a number of VPN routes corresponding to the identifier of the second VPN instance reaches or exceeds the limit value; send second instruction information to the second BGP Peer to instruct that the second BGP Peer is permit to add a VPN route corresponding to the identifier of the second VPN instance, in a case that the number of VPN routes corresponding to the identifier of the second VPN instance is less than the limit value.

In some embodiments, the identifier of the second VPN instance is a second RD, the second instruction information is a second Route Refresh message; the sending module 330 is configured to set a second ORF entry in the second Route Refresh message; set a value of an Action field of the second ORF entry to a third value to indicate that a configured filtering condition corresponding to the second ORF entry should be deleted from an outbound route filter of the second BGP Peer; and add the second RD to a Type-specific-part field of the second ORF entry.

In some embodiments, an AFI (Address Family Identifier) field and a SAFI (Subsequent Address Family Identifier) field in the first Route Refresh message are respectively set to an AFI value and a SAFI value of the first VRF routing table corresponding to the first RD; a When-to-Refresh field of the first Route Refresh message is set to a value which represents "IMMEDIATE".

In some embodiments, an ORF-Type field corresponding to the first ORF entry in the first Route Refresh message is set to a preset value which represents a new ORF type.

Figure 4:
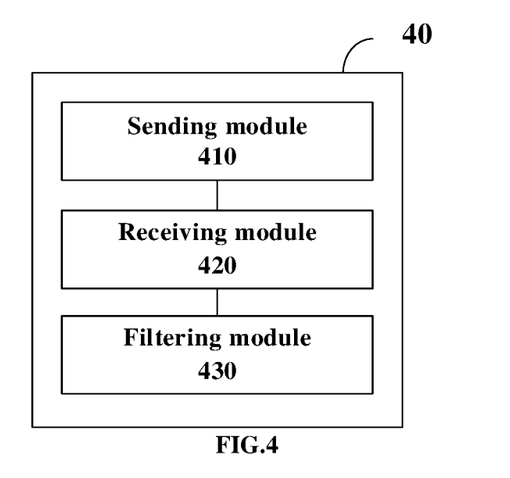
FIG. 4 shows a schematic structural diagram of a BGP Peer according to other embodiments of the present disclosure.

FIG. 4 is a structure diagram of other embodiments of the BGP peer of the present disclosure. As shown in FIG. 4, the BGP peer 40 of this embodiment may serve as a second BGP peer 40, and comprises: a sending module 410, a receiving module 420 and a filtering module 430. The first BGP Peer is an iBGP Peer inside a first AS. The second BGP Peer is a BGP Peer at a border of the first AS, which serves as an eBGP Peer of the first AS and a second AS.

The sending module 410 is configured to send information of adding a new Virtual Private Network (VPN) route to a first BGP Peer, wherein the information of adding the new VPN route comprising: the new VPN route and an identifier of a first VPN instance corresponding to the new VPN route.

The receiving module 420 is configured to receive first instruction information sent from the first BGP Peer, in a case that the first BGP Peer determines that a number of VPN routes corresponding to the identifier of the first VPN instance reaches or exceeds a limit value, wherein the first instruction information is used to instruct the second BGP Peer to stop adding a VPN route corresponding to the identifier of the first VPN instance.

The filtering module 430 is configured to stop adding the VPN route corresponding to the identifier of the first VPN instance to the first BGP Peer according to the first instruction information.

In some embodiments, the identifier of the first VPN instance is a first RD, and the first instruction information is a first Route Refresh message; the filtering module 430 is configured to add a filtering condition for filtering out the VPN route corresponding to the identifier of the first VPN instance in an outbound route filter according to a first Outband Router Filtering (ORF) entry in the first Route Refresh message, wherein the first ORF entry comprises the first RD, filter out a BGP update message comprising the VPN route corresponding to the identifier of the first VPN instance according to the filtering condition.

In some embodiments, the filtering module 430 is configured to parse the first ORF entry having an ORF-Type field set to a preset value in the first Route Refresh message, wherein the preset value represents a new ORF type; parse an Action field in the first ORF entry to obtain a first value indicating that the filtering condition should be added in the outbound route filter of the second BGP Peer; parse a Match field of the first ORF entry to obtain a second value indicating that an addition of a VPN route matching the first ORF entry will be denied; parse a Type-specific-part field of the first ORF entry to obtain the first RD; and add the filtering condition for filtering out the BGP update message comprising the VPN route corresponding to the first RD in the outbound route filter, according to the first value, the second value and the first RD.

In some embodiments, the sending module 410 is configured to send information of withdrawing a VPN Route to be withdrawn to the first BGP Peer, wherein the information of withdrawing the VPN Route to be withdrawn comprises: the VPN route to be withdrawn and an identifier of a second VPN instance corresponding to the VPN route to be withdrawn; receive second instruction information sent from the first BGP Peer, wherein the second instruction information represents that the first BGP Peer determines that a number of VPN routes corresponding to the identifier of the second VPN instance is less than the limit value after deleting the VPN route to be withdrawn, and is used to instruct that the second BGP Peer is permit to add a VPN route corresponding to the identifier of the second VPN instance; and the filtering module 430 is further configured to stop filtering of a message for adding the VPN route corresponding to the identifier of the second VPN instance according to the second instruction information.

In some embodiments, the identifier of the second VPN instance is a second RD, and the second instruction information is a second Route Refresh message; the filtering module 430 is configured to delete a configured filtering condition corresponding to a second ORF entry in an outband route filter according to the second ORF entry in the second Route Refresh message, to pass a BGP update message comprising the VPN route corresponding to the identifier of the second VPN instance, wherein the second ORF entry comprises the second RD.

In some embodiments, the filtering module 430 is configured to parse the second ORF entry having an ORF-Type field set to a preset value in the second Route Refresh message, wherein the preset value represents a new ORF; parse an Action field of the second ORF entry to obtain a third value instructing that the configured filtering condition corresponding to the second ORF entry should be deleted from the outbound route filter of the second BGP Peer; and delete the configured filtering condition corresponding to the second ORF entry from the outbound route filter according to the third value.

In some embodiments, the sending module 410 is further configured to send the first instruction information to a third BGP Peer to instruct the third BGP Peer to stop adding the VPN route corresponding to the identifier of the first VPN instance, wherein the third BGP Peer is an eBGP Peer of the second AS; and the third BGP Peer is configured to send the first instruction information to a fourth BGP Peer to instruct the fourth BGP Peer to stop adding the VPN route corresponding to the identifier of the first VPN instance, wherein the fourth BGP Peer is an iBGP Peer inside the second AS.

The present disclosure further provides a routing control apparatus, which can be provided in a first BGP Peer to execute the method performed by the first BGP Peer in the foregoing embodiment. The routing control apparatus can also be provided in a second BGP Peer to execute the method performed by the second BGP Peer in the foregoing embodiment. The routing control apparatus of this embodiment of the present disclosure may be implemented by various computing devices or computer systems, which will be described below with reference to FIGS. 5 and 6.

Figure 5:
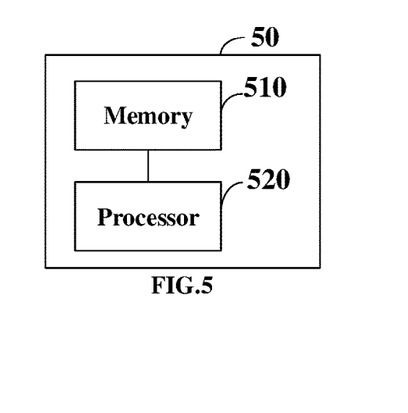
FIG. 5 shows a schematic flowchart of a routing control apparatus according to some embodiments of the present disclosure.

FIG. 5 is a structure diagram of some embodiments of the routing control apparatus of the present disclosure. As shown in FIG. 5, the apparatus 50 of this embodiment comprises a memory 510 and a processor 520 coupled to the memory 510, the processor 520 configured to, based on instructions stored in the memory 510, carry out the routing control method according to any one of the embodiments of the present disclosure.

Wherein, the memory 510 may comprise, for example, system memory, a fixed non-volatile storage medium, or the like. The system memory stores, for example, an operating system, applications, a boot loader, a database, and other programs.

Figure 6:
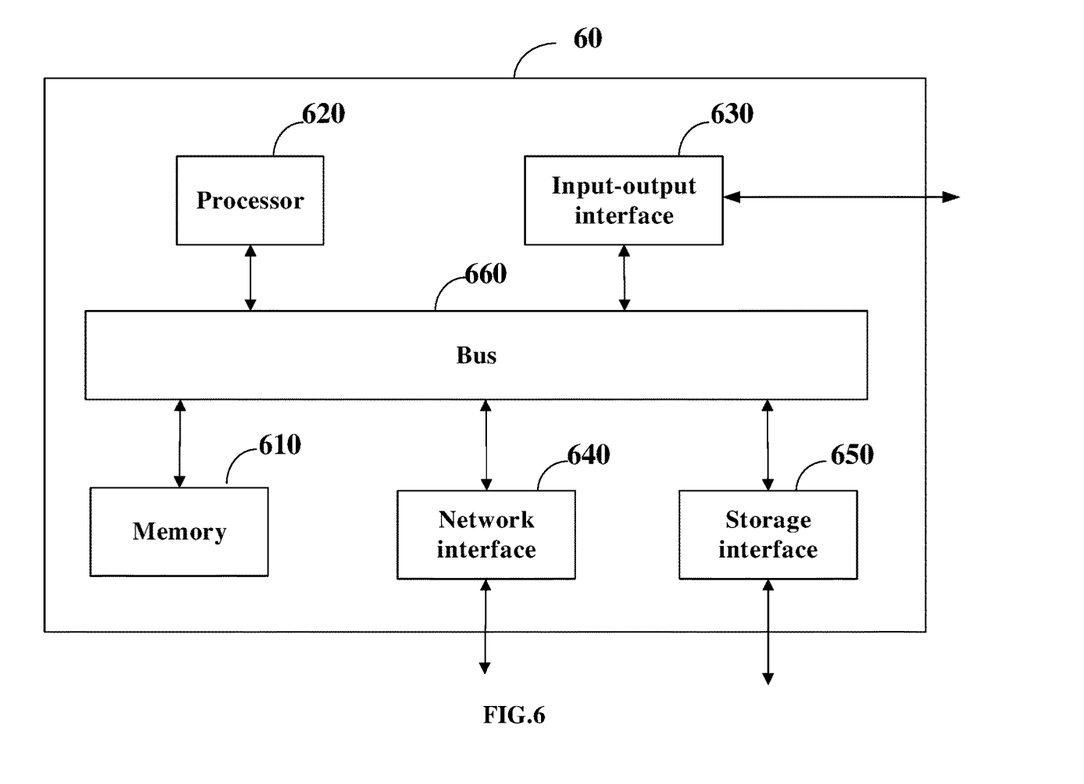
FIG. 6 shows a schematic flowchart of a routing control apparatus according to other embodiments of the present disclosure.

FIG. 6 is a structure diagram of other embodiments of the routing control apparatus of the present disclosure. As shown in FIG. 6, the apparatus 60 of this embodiment comprises: a memory 610 and a processor 620 that are similar to the memory 510 and the processor 520, respectively. It may further comprise an input-output interface 630, a network interface 640, a storage interface 650, and the like. These interfaces 630, 640, 650 and the memory 610 and the processor 620 may be connected through a bus 660, for example. Wherein, the input-output interface 630 provides a connection interface for input-output devices such as a display, a mouse, a keyboard, and a touch screen. The network interface 640 provides a connection interface for various networked devices, for example, it can be connected to a database server or a cloud storage server. The storage interface 650 provides a connection interface for external storage devices such as an SD card and a USB flash disk.

The present disclosure further provides a routing control system, which will be described below with reference to FIG. 7.

Figure 7:
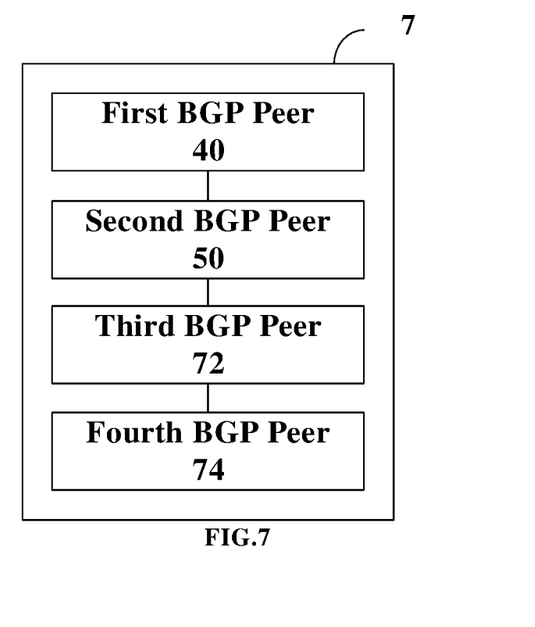
FIG. 7 shows a schematic structural diagram of a routing control system according to some embodiments of the present disclosure.

FIG. 7 is a structure diagram of some embodiments of the routing control system of the present disclosure. As shown in FIG. 7, the system 7 of this embodiment comprises: the first BGP Peer 40 and the second BGP Peer 50 according to any of the foregoing embodiments.

In some embodiments, the system further comprises: a third BGP Peer 72 and a fourth BGP Peer 74.

The second BGP Peer 50 is further used for sending first instruction information to the third BGP Peer 72 to instruct the third BGP Peer 72 to stop the addition of the new VPN route corresponding to the identifier of the first VPN instance, wherein the third BGP Peer 72 is an eBGP Peer of a second AS.

The third BGP Peer 72 is used for receiving the first instruction information sent from the second BGP Peer, stopping adding, to the second BGP Peer 50, the new VPN route corresponding to the identifier of the first VPN instance according to the first instruction information, and sending the first instruction information to the fourth BGP Peer 74 to instruct the fourth BGP Peer 74 to stop the addition of the new VPN route corresponding to the identifier of the first VPN instance, wherein the fourth BGP Peer 74 is an iBGP Peer inside the second AS.

The fourth BGP Peer 74 is used for receiving the first instruction information sent from the third BGP Peer 72, and stopping adding, to the third BGP Peer 72, the new VPN route corresponding to the identifier of the first VPN instance according to the first instruction information; wherein the second BGP Peer 50 is a BGP Peer at the border of the first AS, serving as an eBGP Peer of the first AS and the second AS.

The present disclosure further provides a non-transitory computer-readable storage medium on which a computer program is stored, wherein the program is executed by a processor to implement the routing control method of any one of the foregoing embodiments.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical storage device, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable storage device capable of directing a computer or other programmable data processing apparatus to operate in a specific manner such that the instructions stored in the computer readable storage device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. A routing control method, executed by a first Border Gateway Protocol (BGP) Peer, comprising:
receiving information of adding a new Virtual Private Network (VPN) route sent from a second BGP Peer, wherein the information of adding the new VPN route comprises: the new VPN route and an identifier of a first VPN instance corresponding to the new VPN route;
determining whether a number of VPN routes corresponding to the identifier of the first VPN instance reaches or exceeds a limit value after adding the new VPN route according to the identifier of the first VPN instance; and
sending first instruction information to the second BGP Peer to instruct the second BGP Peer to stop adding a VPN route corresponding to the identifier of the first VPN instance, in a case that the number of VPN routes corresponding to the identifier of the first VPN instance reaches or exceeds the limit value,
wherein the first BGP Peer is an internal Border Gateway Protocol (iBGP) Peer inside a first Autonomous System (AS), the second BGP Peer is a BGP Peer at a border of the first AS and serves as an external Border Gateway Protocol (eBGP) Peer of the first AS and a second AS.

2. The routing control method according to claim 1, wherein the identifier of the first VPN instance is a first Route Distinguisher (RD), and determining whether the number of VPN routes corresponding to the identifier of the first VPN instance reaches or exceeds the limit value after adding the new VPN route according to the identifier of the first VPN instance comprises:
- identifying the first RD comprised in the new VPN route;
- determining a first Virtual Routing Forwarding (VRF) routing table corresponding to the new VPN route according to a Route Target (RT) of the new VPN route, and removing the first RD from the new VPN route;
- adding the new VPN route having the first RD removed to the first VRF routing table according to the RT of the new VPN route; and
- determining whether the number of routing entries in the first VRF routing table reaches or exceeds the limit value.

3. The routing control method according to claim 1, wherein the identifier of the first VPN instance is a first Route Distinguisher (RD), the first instruction information is a first Route Refresh message, and sending first instruction information to the second BGP Peer comprises:
- setting a first Outband Router Filtering (ORF) entry in the first Route Refresh message;
- setting a value of an Action field of the first ORF entry to a first value to indicate that a filtering condition corresponding to the first ORF entry should be added to an outbound route filter of the second BGP Peer;
- setting a value of a Match field of the first ORF entry to a second value to indicate that an addition of a VPN route matching the first ORF entry will be denied; and
- adding the first RD to a Type-specific-part field of the first ORF entry.

4. The routing control method according to claim 1, further comprising:
- receiving information of withdrawing a VPN Route to be withdrawn sent from the second BGP Peer, wherein the information of withdrawing the VPN Route to be withdrawn comprises:
- the VPN route to be withdrawn and an identifier of a second VPN instance corresponding to the VPN route to be withdrawn;
- deleting the VPN route to be withdrawn according to the identifier of the second VPN instance;
- determining whether the number of VPN routes corresponding to the identifier of the second VPN instance is less than the limit value after deleting the VPN route to be withdrawn, in a case that a number of VPN routes corresponding to the identifier of the second VPN instance reaches or exceeds the limit value; and
- sending second instruction information to the second BGP Peer to instruct that the second BGP Peer is permit to add a VPN route corresponding to the identifier of the second VPN instance, in a case that the number of VPN routes corresponding to the identifier of the second VPN instance is less than the limit value.

5. The routing control method according to claim 4, wherein the identifier of the second VPN instance is a second RD, the second instruction information is a second Route Refresh message, and sending the second instruction information to the second BGP Peer comprises:
- setting a second ORF entry in the second Route Refresh message;
- setting a value of an Action field of the second ORF entry to a third value to indicate that a configured filtering condition corresponding to the second ORF entry should be deleted from an outbound route filter of the second BGP Peer; and
- adding the second RD to a Type-specific-part field of the second ORF entry.

6. The routing control method according to claim 3, wherein:
- an Address Family Identifier (AFI) field and a Subsequent Address Family Identifier (SAFI) field in the first Route Refresh message are respectively set to an AFI value and a SAFI value of a first Virtual Routing Forwarding (VRF) routing table corresponding to the first RD;
- a When-to-Refresh field of the first Route Refresh message is set to a value which represents "IMMEDIATE"; or
- an ORF-Type field corresponding to the first ORF entry in the first Route Refresh message is set to a preset value which represents a new ORF type.

7. The routing control method according to claim 5, wherein:
- an AFI field and a SAFI field in the second Route Refresh message are respectively set to an AFI value and a SAFI value of a second VRF routing table corresponding to the second RD;
- a When-to-Refresh field of the second Route Refresh message is set to a value which represents "IMMEDIATE"; or
- an ORF-Type field corresponding to the second ORF entry in the second Route Refresh message is set to a preset value which represents a new ORF type.

8. A routing control method, executed by a second Border Gateway Protocol (BGP) Peer, comprising:
- sending information of adding a new Virtual Private Network (VPN) route to a first BGP Peer, wherein the information of adding the new VPN route comprising: the new VPN route and an identifier of a first VPN instance corresponding to the new VPN route;
- receiving first instruction information sent from the first BGP Peer, in a case that the first BGP Peer determines that a number of VPN routes corresponding to the identifier of the first VPN instance reaches or exceeds a limit value, wherein the first instruction information is used to instruct the second BGP Peer to stop adding a VPN route corresponding to the identifier of the first VPN instance; and
- stopping adding the VPN route corresponding to the identifier of the first VPN instance to the first BGP Peer according to the first instruction information,
- wherein the first BGP Peer is an internal Border Gateway Protocol (iBGP) Peer inside a first Autonomous System (AS), the second BGP Peer is a BGP Peer at a border of the first AS and serves as an external Border Gateway Protocol (eBGP) Peer of the first AS and a second AS.

9. The routing control method according to claim 8, further comprising:
- sending the first instruction information to a third BGP Peer to instruct the third BGP Peer to stop adding the VPN route corresponding to the identifier of the first VPN instance, wherein the third BGP Peer is an eBGP Peer of the second AS; and
- sending, from the third BGP Peer, the first instruction information to a fourth BGP Peer to instruct the fourth BGP Peer to stop adding the VPN route corresponding to the identifier of the first VPN instance, wherein the fourth BGP Peer is an iBGP Peer inside the second AS.

10. The routing control method according to claim 8, wherein the identifier of the first VPN instance is a first RD, the first instruction information is a first Route Refresh message, and stopping adding the VPN route corresponding to the identifier of the first VPN instance to the first BGP Peer according to the first instruction information comprises:
  adding a filtering condition for filtering out the VPN route corresponding to the identifier of the first VPN instance in an outbound route filter according to a first Outband Router Filtering (ORF) entry in the first Route Refresh message, wherein the first ORF entry comprises the first RD; and
  filtering out a BGP update message comprising the VPN route corresponding to the identifier of the first VPN instance according to the filtering condition.

11. The routing control method according to claim 10, wherein adding the filtering condition for filtering out the VPN route corresponding to the identifier of the first VPN instance in the outbound route filter according to the first ORF entry in the first Route Refresh message comprises:
  parsing the first ORF entry having an ORF-Type field set to a preset value in the first Route Refresh message, wherein the preset value represents a new ORF type;
  parsing an Action field in the first ORF entry to obtain a first value indicating that the filtering condition should be added in the outbound route filter of the second BGP Peer;
  parsing a Match field of the first ORF entry to obtain a second value indicating that an addition of a VPN route matching the first ORF entry will be denied;
  parsing a Type-specific-part field of the first ORF entry to obtain the first RD; and
  adding the filtering condition for filtering out the BGP update message comprising the VPN route corresponding to the first RD in the outbound route filter, according to the first value, the second value and the first RD.

12. The routing control method according to claim 8, further comprising:
  sending information of withdrawing a VPN Route to be withdrawn to the first BGP Peer, wherein the information of withdrawing the VPN Route to be withdrawn comprises: the VPN route to be withdrawn and an identifier of a second VPN instance corresponding to the VPN route to be withdrawn;
  receiving second instruction information sent from the first BGP Peer, wherein the second instruction information represents that the first BGP Peer determines that a number of VPN routes corresponding to the identifier of the second VPN instance is less than the limit value after deleting the VPN route to be withdrawn, and is used to instruct that the second BGP Peer is permit to add a VPN route corresponding to the identifier of the second VPN instance; and
  stopping filtering of a message for adding the VPN route corresponding to the identifier of the second VPN according to the second instruction information.

13. The routing control method according to claim 12, wherein the identifier of the second VPN instance is a second RD, the second instruction information is a second Route Refresh message, and stopping filtering of the message for adding the VPN route corresponding to the identifier of the second VPN instance according to the second instruction information comprises:
  deleting a configured filtering condition corresponding to a second ORF entry in an outband route filter according to the second ORF entry in the second Route Refresh message, to pass a BGP update message comprising the VPN route corresponding to the identifier of the second VPN instance, wherein the second ORF entry comprises the second RD.

14. The routing control method according to claim 13, wherein deleting the configured filtering condition corresponding to the second ORF entry in the outbound route filter according to the second ORF entry in the second Route Refresh message comprises:
  parsing the second ORF entry having an ORF-Type field set to a preset value in the second Route Refresh message, wherein the preset value represents a new ORF;
  parsing an Action field of the second ORF entry to obtain a third value instructing that the configured filtering condition corresponding to the second ORF entry should be deleted from the outbound route filter of the second BGP Peer; and
  deleting the configured filtering condition corresponding to the second ORF entry from the outbound route filter according to the third value.

15. A Border Gateway Protocol (BGP) Peer, comprising:
  a processor; and
  a memory coupled to the processor for storing instructions, which when executed by the processor, cause the processor to execute the routing control method according to claim 1.

16. A Border Gateway Protocol (BGP) Peer, comprising:
  a processor; and
  a memory coupled to the processor for storing instructions, which when executed by the processor, cause the processor to execute the routing control method according to claim 8.

17. A routing control system, comprising: a BGP Peer according to claim 15, which serves as a first BGP Peer; and
  a second BGP Peer configure to send information of adding a new Virtual Private Network (VPN) route to a first BGP Peer, wherein the information of adding the new VPN route comprising: the new VPN route and an identifier of a first VPN instance corresponding to the new VPN route; receive first instruction information sent from the first BGP Peer, in a case that the first BGP Peer determines that a number of VPN routes corresponding to the identifier of the first VPN instance reaches or exceeds a limit value, wherein the first instruction information is used to instruct the second BGP Peer to stop adding a VPN route corresponding to the identifier of the first VPN instance; and stop adding the VPN route corresponding to the identifier of the first VPN instance to the first BGP Peer according to the first instruction information, wherein the first BGP Peer is an internal Border Gateway Protocol (iBGP) Peer.

18. The routing control system according to claim 17, further comprising: a third BGP Peer and a fourth BGP Peer, wherein:
  the second BGP Peer is further configured to send the first instruction information to the third BGP Peer to instruct the third BGP Peer to stop adding the VPN route corresponding to the identifier of the first VPN instance, wherein the third BGP Peer is an eBGP Peer of the second AS;
  the third BGP Peer is configured to receive the first instruction information sent from the second BGP Peer; stopping adding the VPN route corresponding to the identifier of the first VPN instance according to the first instruction information to the second BGP Peer; and send the first instruction information to the fourth BGP Peer to instruct the fourth BGP Peer to stop adding the VPN route corresponding to the identifier of the first VPN instance, wherein the fourth BGP Peer is an iBGP Peer inside the second AS; and the fourth BGP Peer is configured to receive the first instruction information sent from the third BGP Peer, and stopping adding the VPN route corresponding to the identifier of the first VPN instance according to the first instruction information to the third BGP Peer.

\* \* \* \* \*